3,079,397
PROCESS FOR PREPARATION OF CERTAIN
4,4-DISUBSTITUTED PYRAZOLONES
Fernanda Misani Fiordalisi, 40 Tamaques Way,
Westfield, N.J.
No Drawing. Filed Dec. 29, 1959, Ser. No. 862,450
2 Claims. (Cl. 260—310)

This invention relates to new compounds containing the pyrazolone nucleus and, more particularly, to 4,4-disubstituted 5-pyrazolones.

The pyrazolone nucleus has been known for a long time to exist in three tautomeric structures, and ultraviolet absorption spectra indicate that 1,3-disubstituted 5-pyrazolones may react according to the three following formulae:

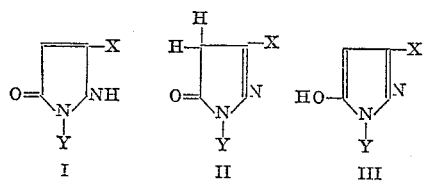

Structure I is present in several substituted pyrazolones which are widely known and used as antipyretic agents. Antipyrine, tolypyrine, aminopyrine, melubrine are some of the most important members of this series. All these compounds are characterized by the presence of a phenyl group attached to the nitrogen atom in the 1-position and a methyl group in the 3-position. The 4-position is usually, but not necessarily, substituted, because for instance it is unsubstituted in antipyrine and tolyprine. The nitrogen atom in the 2-position is substituted in antipyrine and melubrine, but it is unsubstituted in aminopyrine.

It seems reasonable to conclude that a phenyl group in the 1-position and a methyl group in the 3-position are essential for antipyretic activity, but that substitution in the 4-position is not essential.

Several 4,4-dimethyl derivatives, as well as Pyrazole Blue and Tartrazine, are derived from Formula II. The existence of structure III has been invoked to explain the products resulting from methylation with diazomethane or acylation with acid chlorides and alkali, which are O-alkyl and O-acyl derivatives. Several pyrazolone dyes are derived from structure III.

In spite of the extensive research in the field of pyrazolones, no pharmacological or clinical use has ever been reported for any compound derived from structure II, more specifically for compounds containing two substituents in the 4-position. In view of the extensive literature data in the field of pyrazolones and the absence of any physiological activity of the known pyrazolones derived from structure II, it was novel and surprising to find that compounds derived from structure II possess significant value as central depressants and more particularly as anticonvulsants.

The object of this invention is to prepare 4,4-disubstituted pyrazolones, which are unsubstituted on the two nitrogen atoms.

Another object of the invention is to describe the novel method used for the preparation of the compounds of the invention.

Other objects of the invention will appear from the specification and examples.

The compounds of the invention have the formula:

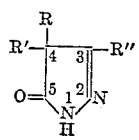

in which R is an alkyl group containing up to four carbon atoms, R' is an aryl group and R" is selected from the group consisting of hydrogen and a low-molecular-weight alkyl group. It is also possible, according to the invention, that R and R' represent the same substituent.

In view of the essential features indicated above, exhibited by compounds having antipyretic activity, that is, a phenyl group on the nitrogen in the 1-position and a methyl group in the 3-position, it was also novel and unforeseeable that the anticonvulsant activity reaches the maximum value in 4-methyl-4-phenyl pyrazolone, that is, a compound which is unsubstituted both on the two nitrogen atoms and in the 3-position.

The anticonvulsant activity of the compounds of this invention may perhaps be explained by the fact that they contain the group

that is, these compounds are structurally related to known hypnotics and central depressants. It is not a mere coincidence that this moiety is found for instance in hydantoins, disubstituted barbiturates, oxazolidinediones, hexahydropyrimidinediones, Noludar and Doriden.

The fact that the two substituents in the 4-position of the pyrazolones of this invention are essential to physiological activity is analogous to the barbiturates where 5-unsubstituted or 5-monosubstituted barbiturates are well known to be devoid of any physiological activity. Although the mechanism of action of the compounds of the invention appears to be analogous to the known central depressants, it is to be understood that the scope of this invention is not limited by theoretical consideration of mode of action on the brain centers, mainly because such a mode of action is still little known or inadequately understood.

Anticonvulsant activity is the ability of a compound to prevent epileptic seizures, that is, convulsions accompanied by loss of consciousness, which are known as "grand mal epilepsy," and also the ability to control the milder attacks not accompanied by convulsions, known as "petit mal."

The method used for the preparation of the compounds of the invention consisted of the reaction of an α,α-disubstituted ester containing a carbonyl group in the β-position with hydrazine, as represented below:

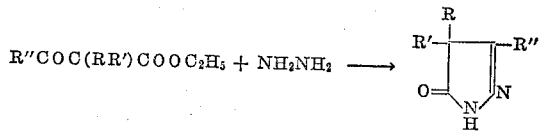

According to this equation, R, R' and R" have the same meaning as indicated above, that is, R and R' may be the same or different and may be either an alkyl group containing up to four carbon atoms or an aryl group, and R" may be hydrogen or a low-molecular-weight alkyl group. It is also possible that R and R' are the same.

The synthesis of the compounds of this invention offered considerable difficulties. In Karrer "Organic Chemistry" (Elsevier Publishing Company), 4th edition (1950), it is stated on page 798:

"A very general synthesis of pyrazolone compounds consists in the action of hydrazine or hydrazine derivatives on esters of β-ketonic acids. If formyl acetic ester is used in place of the latter, the parent substance, the simplest pyrazolone, is formed."

In spite of the statement found in Karrer and in spite of the fact that the literature shows many examples of pyrazolone synthesis from phenylhydrazine and substituted acetoacetic esters, when this basic reaction was applied to the synthesis of the compounds of this invention, using hydrazine and disubstituted β-keto- or β-formyl esters, the reaction was satisfactory only with the lower members of the series. For instance, 3,4,4-trimethyl pyrazolone was satisfactorily prepared from dimethyl acetoacetic ester and hydrazine, but the reaction failed when applied to the dibutyl acetoacetic ester. Essentially, the reaction is an addition of hydrazine to the carbonyl group, complicated by the basic character of hydrazine, which is a stronger base than phenylhydrazine, the lack of enolization in the ester component because the presence of two substituents in the α-position and the relatively higher molecular weight of the two substituents, that is, the butyl groups instead of methyl groups. The lack of enolization in the ester component is responsible for the difficulty in the formation of the ester-hydrazine transition complex, represented below by Formula A

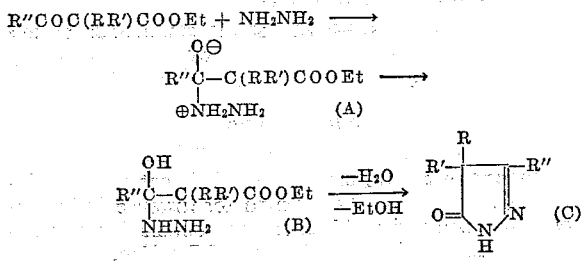

The high basicity of hydrazine is expected to make the proton transfer from this transition complex A to the compound shown by B more difficult than in the corresponding complex, where phenylhydrazine is involved. Obviously, the equilibrium is not in favor of the hydrazone formation, and for the pyrazolone synthesis which involves a further cyclodehydration step to give C. The above mentioned theoretical considerations led to the adoption of the following method. It was found that the reaction proceeds satisfactorily by allowing equivalent amounts of hydrazine and the α-disubstituted β-keto or β-formyl ester to react overnight after adjusting the pH to 5, under conditions which provide for the removal of the water formed in the reaction. Thus, decrease of basicity and shifting the equilibrium in favor of the pyrazolone by elimination of the water formed proved very advantageous.

The reaction may be conveniently carried out by placing molar equivalents of hydrazine and of the ester component, preferably in a solvent, in a flask provided with a Soxlet extraction apparatus and placing a dehydrating agent in the thimble of the Soxlet extraction apparatus. Calcium oxide and barium oxide are suitable dehydrating agents, but other dehydrating agents, such as magnesium sulfate and calcium sulfate, may be used. The amount of the dehydrating agent should be sufficient to absorb all the water formed in the reaction, but an excess is preferable.

Obviously, any technique, which allows for the removal of water, is satisfactory, although the procedure comprising refluxing in a Soxlet apparatus with calcium oxide represents the preferred embodiment of the invention. Ethanol is a suitable solvent, but other solvents inert to the reactants may be used.

The method has general application for the synthesis of pyrazolones containing two relatively high-molecular-weight substituents in the 4-position and characterized by the absence of substituents on the two nitrogen atoms.

The following examples are given for the purpose of illustrating the invention, but it is to be understood that the invention is to be limited only by the appended claims.

EXAMPLE 1

*3-Methyl-4,4-Dibutyl-Pyrazolone*

5 g. of ethyl dibutyl aceto-acetate, 3.4 g. of 85% hydrazine hydrate were dissolved in 150 ml. ethanol and the pH was adjusted to about 5 by dropwise addition of acetic acid. The solution was refluxed for about 16 hours in a flask provided with a Soxlet thimble containing 20 g. of calcium oxide. Then the solution was filtered to remove traces of calcium oxide carried over into the flask, concentrated to about 15 ml. and diluted with an equal volume of water. A crop of 3 g. of product having a melting point of 95–100° C. was obtained, which was further purified by recrystallization from benzene and precipitation with petroleum ether (B.P. 70–90° C.). The melting point of the pure product was 102–103° C. *Analysis.*—Calcd. for $C_{12}H_{22}N_2O$: C, 68.53; H, 10.54. Found: C, 68.69; H, 10.62.

The substance showed some anticonvulsant activity, but was more toxic than the 4-phenyl-4-methyl compound described in Example 2.

EXAMPLE 2

*4-Methyl-4-Phenyl-5-Pyrazolone*

Four and three tenths of a gram of ethyl α-formyl α-methyl phenyl acetate, 3.6 grams of 85% hydrazine hydrate were dissolved in 300 ml. of absolute ethanol, and the solution was brought to pH 5 by dropwise addition of acetic acid. The solution was placed in a flask provided with a Soxlet apparatus, and 40 grams of calcium oxide were placed in the thimble. After refluxing for about 17 hours, the solution was filtered, concentrated to about 25 ml. and diluted with an equal volume of water. The crude product, 2.3 grams, recrystallized from heptane and acetone, gave a crop of 1.6 grams of melting point 98–101° C.

Extraction with heptane and concentration of the heptane solution raised the melting point to 99–101° C. *Analysis.*—Calcd. for $C_{10}H_{10}N_2O$: N, 16.08. Found: N, 15.87.

4-methyl-4-phenyl pyrazolone was tested by the minimum electro-shock procedure. The animals were administered the substance orally, and after one hour they were subjected to the direct crurent stimulus, that is, to about three times the current necessary to produce maximum seizures. The dose required to prevent convulsions in one half of the animals tested, in milligrams per kilogram, that is $ED_{50}$, was 89. The substance had low toxicity, because the $NTS_{50}$, that is the amount of drug in milligrams per kilogram, which produced neurological toxic symptoms in one half of the animals tested, was 187.

The 3-methyl-4,4-dibutyl pyrazolone, prepared according to Example 1, showed some anticonvulsant activity, but was less active than 4-methyl-4-phenyl-pyrazolone, and more toxic.

It appears that the absence of the methyl group in position 3 and the presence of a phenyl group in position 4 are beneficial for anticonvulsant activity.

I claim:

1. The process of preparing 4,4-disubstituted pyrazolones of formula

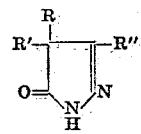

wherein each of R and $R^1$ is a member selected from the group consisting of alkyl of 1 to 4 carbon atoms and phenyl, further characterized by the fact that R may be the same as $R^1$, and $R^{11}$ is a member selected from the group consisting of hydrogen and lower alkyl, which comprises the steps of adjusting to about 5 the pH of an ethanolic solution of a compound of formula $R^{11}COC(RR^1)COOR^{111}$, wherein $R, R^1$ and $R^{11}$ have the same meaning as above and $R^{111}$, is lower alkyl, and the equivalent amount of hydrazine hydrate, refluxing said solution in a flask provided with a Soxlet thimble, said thimble containing a dehydrating agent which is a member selected from the group consisting of CaO, BaO, $MgSO_4$, $Na_2SO_4$ and anhydrous $K_2CO_3$, continuing refluxing until all the water formed is removed, and isolating said 4,4-disubstituted pyrazolone from the reaction mixture.

2. The process according to claim 1, wherein said dehydrating agent is CaO in amount exceeding the theoretical amount required to remove the water formed in the reaction.

References Cited in the file of this patent

UNITED STATES PATENTS

| | | |
|---|---|---|
| 2,637,732 | Schmid et al. | May 5, 1953 |
| 2,878,263 | Oroshnik | Mar. 17, 1959 |
| 2,933,391 | Feniak et al. | Apr. 19, 1960 |

OTHER REFERENCES

Backer et al.: Chem. Abstracts, volume 20, page 1990 (1926).

Beilstein (Handbuch, 4th edition), volume 24, 2nd Supplement, page 80 (1954).

Veibel et al.: Chem. Abstracts, volume 49, column 14741 (1955).

Elderfield: "Heterocyclic Comp'ds," volume 5, pages 114–119 (1957).